(12) United States Patent
Heidtmann et al.

(10) Patent No.: US 10,894,604 B2
(45) Date of Patent: Jan. 19, 2021

(54) ARRANGEMENT IN A CABIN OF AN AIRCRAFT AS WELL AS AN AIRCRAFT HAVING SUCH AN ARRANGEMENT

(71) Applicant: Airbus Operations GmbH, Hamburg (DE)

(72) Inventors: Andreas Heidtmann, Hamburg (DE); Roland Lange, Hamburg (DE)

(73) Assignee: Airbus Operations GmbH ( * ) Notice: Subject to any disclaimer, the term of this patent is extended or adjusted under 35 U.S.C. 154(b) by 220 days.

(21) Appl. No.: 15/479,426

(22) Filed: Apr. 5, 2017

(65) Prior Publication Data
US 2017/0291709 A1 Oct. 12, 2017

(30) Foreign Application Priority Data
Apr. 6, 2016 (DE) .................. 10 2016 106 279

(51) Int. Cl.
B64D 11/00 (2006.01)
B64D 11/06 (2006.01)

(52) U.S. Cl.
CPC ............ B64D 11/003 (2013.01); B64D 11/06 (2013.01)

(58) Field of Classification Search
CPC ... B64D 11/003; B64D 11/06; B64D 11/0601; B64D 11/0602; B64D 11/00; B64D 11/0627; B64D 11/0629; B64D 11/0646; B64C 1/00
See application file for complete search history.

(56) References Cited

U.S. PATENT DOCUMENTS

| 3,738,497 | A | * | 6/1973 | Betts | ............... | A47G 25/02 211/1.57 |
| 6,000,659 | A | * | 12/1999 | Brauer | ............ | B64D 11/00 244/118.5 |
| 6,273,365 | B1 | | 8/2001 | Hiesener et al. | | |
| 6,616,099 | B2 | * | 9/2003 | Sankrithi | ............ | B60N 3/08 244/118.6 |
| 6,913,227 | B1 | * | 7/2005 | Mahmulyin | ........ | B64D 11/06 244/118.5 |
| 8,870,116 | B2 | * | 10/2014 | Boren | ............... | B64D 11/00 244/118.6 |

(Continued)

FOREIGN PATENT DOCUMENTS

| DE | 199 10 779 A1 | 9/2000 |
| DE | 10 2011 116 519 A1 | 4/2013 |

(Continued)

Primary Examiner — Medhat Badawi
Assistant Examiner — Vicente Rodriguez
(74) Attorney, Agent, or Firm — Lerner, David, Littenberg, Krumholz & Mentlik, LLP

(57) ABSTRACT

An arrangement in a cabin of an aircraft includes a plurality of passenger seats, which create seat rows arranged between at least one aisle and a cabin wall. At least one first section has at least one row with a first number of passenger seats and at least one second section has at least one seat row with a second number of passenger seats, that is below the first number, are created. The at least one seat row of the first section and the at least one seat row of the second section directly border on the at least one aisle. In the second section between a passenger seat facing the cabin wall and the respective cabin wall a stowage compartment is arranged, which is positionable on a cabin floor.

13 Claims, 2 Drawing Sheets

(56) References Cited

U.S. PATENT DOCUMENTS

| | | | | |
|---|---|---|---|---|
| 8,944,505 B2 * | 2/2015 | Khalil | ............. | B60N 2/22 244/118.6 |
| 9,889,936 B2 * | 2/2018 | Campbell | ............. | B64D 11/06 |
| 2003/0071507 A1 | 4/2003 | Sankrithi | | |
| 2012/0048998 A1 | 3/2012 | Schliwa et al. | | |
| 2014/0224931 A1 * | 8/2014 | Weitzel | ............. | B64D 11/06 244/118.6 |
| 2014/0332629 A1 * | 11/2014 | Hashberger | ............. | B64D 11/00 244/118.6 |

FOREIGN PATENT DOCUMENTS

| | | |
|---|---|---|
| EP | 2 052 706 A2 | 4/2009 |
| EP | 2 423 107 A2 | 2/2012 |
| WO | 2014/071335 A1 | 5/2014 |

* cited by examiner

ARRANGEMENT IN A CABIN OF AN AIRCRAFT AS WELL AS AN AIRCRAFT HAVING SUCH AN ARRANGEMENT

FIELD OF THE INVENTION

The invention relates to an arrangement in a cabin of an aircraft as well as an aircraft having such an arrangement.

BACKGROUND OF THE INVENTION

The equipment of passenger cabins in transportation means and particularly in aircraft is often subjected to the desire of maximizing the available number of passenger seats without reducing the passenger comfort, under fulfilment of all safety relevant regulations at the same time and under use of common comfort relevant installations. This includes inter alia individual and common utilities, lavatories, galleys and similar. A ratio of the number of passenger seats to remaining installations in passenger cabins is a factor, which co-determines the profitability in line operation. A maximizing of passenger seats may inter alia be realized using intelligent construction and arrangement solutions.

By reconfiguration of a door region between two opposed aircraft doors, and installations bordering thereto, it may possibly be feasible to integrate an additional row of seats into the cabin of an aircraft that directly borders the door region. However, due to the extension of installations of the aircraft door into the door region as well as due to the tapering of an aircraft fuselage in the region of forward aircraft doors or rear aircraft doors, a larger distance of an outer seat to a cabin wall bordering the aircraft door is required since otherwise a sufficient legroom for a passenger would not be realizable. For these regions, usually seat rows are used, which have a reduced number of passenger seats. These are shifted from a bordering aisle in the direction of the cabin wall, such that particularly in a door region the aisle is slightly broadened.

The integration of additional passenger seats furthermore increases the expectable amount of hand luggage in the cabin, which necessitates installation or release of additional over-head-stowage bins for this purpose.

EP 2 423 107 A2 shows an arrangement for receiving passengers in a transportation means having three placement spaces arranged adjacent to each other, which are arranged in a door near region of the passenger cabin, in which commonly a galley is installed.

BRIEF SUMMARY OF THE INVENTION

Hence, an aspect of the invention proposes a space optimized arrangement in a cabin of an aircraft, which allows an optimum utilization of the cabin and requires only little modifications at the same time.

An arrangement in a cabin of an aircraft is proposed. The arrangement comprises a plurality of passenger seats, which create seat rows arranged between at least one aisle and a cabin wall, wherein at least one first section having at least one row with a first number of passenger seats and at least one second section having at least one seat row with a second number of passenger seats, that is below the first number, are created, wherein the at least one seat row of the first section and the at least one seat row of the second section directly border on the at least one aisle and wherein in the second section between a passenger seat facing the cabin wall and the respective cabin wall a stowage compartment is arranged, which is positionable on a cabin floor.

Consequently, the arrangement according to an embodiment of the invention particularly relates to a region in the cabin of the aircraft, in which the seating measure, i.e. the number of seats in a seat row, changes, which may occur under a plurality of conditions. For example, it is known, that an aircraft fuselage is realized largely cylindrical with a constant width over a predominant fuselage length, but tapers in a nose region and a rear region. As the cabin wall follows the fuselage contour, with decreasing width a seating measure in these regions cannot correspond to the seating measure of a region with a larger width. If the cabin predominantly comprises seat rows with three passenger seats between an aisle and a cabin wall, switching to two passenger seats per row may occur in the tapered regions.

Furthermore, due to different installations, which extend from a cabin wall region laterally inwards, a sufficient installation space for a full passenger seat may be lacking, wherein still a certain installation space is available. The integration of a stowage compartment arranged on a floor consequently offers the possibility to reasonably use this region without impairing the passenger comfort on neighbouring or adjacent seats.

The stowage compartment, which is placed at the given location, comprises an outer delimiting wall facing to the cabin wall, which delimiting wall follows the contour of the adjacent cabin wall. It is conceivable that the cabin wall comprises a cut-out in the region that laterally borders on the stowage compartment, through which the stowage compartment slightly extends in a lateral direction, i.e. a few centimetres, in an outward direction. In doing so, a particularly efficient design of the installation space is achieved, since not only the available stowage volume is increased, but also the weight is limited, since the stowage compartment fulfils the function of the cabin wall in the region of the cut-out.

As common stowage compartments in an aircraft, the stowage compartment may be realized from a laminate, a sandwich material having a honeycomb core enclosed by covering layers or similar materials, which comprise a low weight, but a sufficient rigidity.

Furthermore, a special characteristic lies in that the seats facing the aisle directly connect thereto, such that independent from the first section and the second section, a constant width of the aisle and a straight aisle delimitation to the passenger seats is present. Hence, shifting of seat rows from an aisle further to a cabin wall is not necessary or not desired, respectively.

In the following, the terms of the longitudinal direction, x- and z-axis are used, which correspond to the aircraft fixed coordinate system, i.e. the x-direction is to be understood in aircraft longitudinal axis, the z-axis as vertical axis, which e.g. is perpendicular to the cabin floor.

In a preferred embodiment, the first number is three and the second number is two. The second section may consequently border directly on e.g. a door region in the aircraft cabin, which denotes a section created on the cabin floor that is roughly perpendicular to an extension plane of a cabin access opening through a fuselage wall into the cabin or along a connection line of two opposed aircraft doors, respectively. At this point, particularly with front or rear aircraft doors, a tapered section may be present and/or due to a dedicated emergency slide or life raft receptacle, a sufficient space for a full passenger seat may not be present.

In an advantageous embodiment, the stowage compartment comprises at least one access opening facing to a laterally neighbouring passenger seat, which access opening is closable through at least one stowage compartment flap. The stowage compartment may consequently be filled from a position between the lateral outer passenger seat and the stowage compartment, without requiring an access from a door region. Consequently, a passenger present on a laterally outer passenger seat may put personal luggage into the stowage compartment and may access it from there. As an alternative or additional thereto it is conceivable to place required equipment items into the stowage compartment, which need to be accessed only seldom or only in exceptional situations. As an example, a megaphone or a defibrillator are mentioned. The access opening for a partial section of the stowage compartment, which is usable for such equipment items, may be accessible from another direction.

Preferably, the stowage compartment comprises a delimiting surface, which is planar to the laterally adjacent passenger seat, which delimiting surface may be integratable near the laterally adjacent passenger seat depending on position and design of optional closure flaps.

Particularly preferred the stowage compartment does not extend over the laterally neighbouring passenger seat in the longitudinal direction of the cabin in the seating direction. In doing so, restrictions of the passenger comfort of passenger seats that connect in longitudinal direction of the cabin, in particular of passengers on passenger seats directly in front of or behind, may consequently be prevented.

The stowage compartment may comprise an extension in a vertical direction, which corresponds to the extension of the laterally directly neighbouring passenger seat. In particular, during lateral movements of the aircraft, it may be prevented to create hard impact edges for a passenger on a laterally adjacent passenger seat.

Particularly preferred the stowage compartment comprises a forward delimitation wall, which faces to a passenger seat that is arranged in front of the stowage compartment in a seating direction, which delimitation wall is designed for allowing a backrest of the passenger seat of the first section arranged in front of it to swivel into a swivelled back position up to at least 20° and preferably up to at least 30°. In doing so, the stowage compartment does not necessarily need to comprise the same extension as the laterally directly neighbouring passenger seat at a maximum, as long as the backrest of the passenger seat arranged directly in front of it may be swivelled back.

It is advantageous if the stowage compartment extends up to a forward end of the second section in the longitudinal direction of the cabin. Even though a first section connects thereto, a reduction of the passenger comfort of a passenger directly in front of it may be counteracted, in case a forward delimitation wall is designed as described above.

It is conceivable that a plurality of second rows are arranged in a continuous second section in the cabin one behind the other, wherein the stowage compartment extends along at least one of the second rows in the longitudinal direction of the cabin. This may exemplarily be the case at a forward most or rearmost row, in which slightly more installation space may be available as in the respectively bordering rows.

However, for increasing the functionality in the cabin it is advantageous that the stowage compartment extends along a plurality of the second rows of the continuous second section in the longitudinal direction of the cabin. The design of the cross-section on an x-z-plane of an aircraft fixed coordinate system does not necessarily have to be constant along the x-axis, but may be adapted to optional changes of the cabin wall.

A certain advantage arises in case the stowage compartment extends along all second rows of the continuous second section along the cabin longitudinal direction and, consequently, the maximum installation space within the second section is used.

The invention further relates to an aircraft having a fuselage, a cabin created therein as well as an arrangement according to the above description arranged therein.

The aircraft may be designed such that the arrangement is positioned at a door region and that the second section directly borders on the door region. Further, the arrangement may be arranged in a tapered fuselage region as an alternative or additional thereto.

BRIEF DESCRIPTION OF THE FIGURES

Other characteristics, advantages and potential applications of the present invention result from the following description of the exemplary embodiments and the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

DETAILED DESCRIPTION

Figure 1:
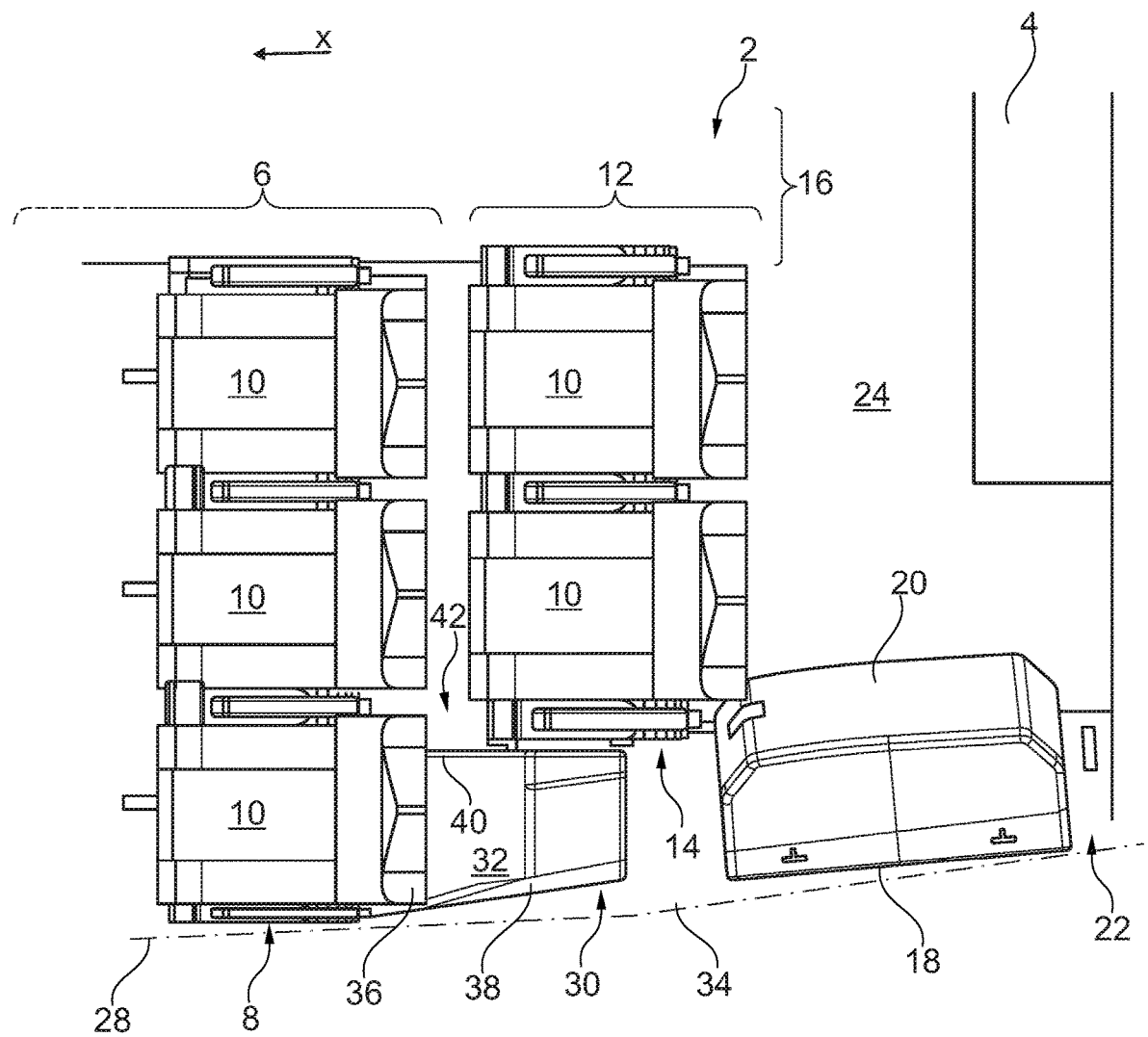
FIG. 1 shows a top view onto an arrangement positioned in a cabin of an aircraft.

FIG. 1 shows an arrangement 2 in a cabin 4 of an aircraft having a first section 6 with a seat row 8 with three passenger seats 10 and a second section 12 positioned directly behind it having a seat row 14 with two passenger seats 10. The seat rows 8 and 14 directly border on an aisle 16, which extends in a longitudinal direction x of the cabin. Consequently, the width of the aisle 16 is constant at least in the region shown in FIG. 1, even though the seating measure changes.

A special characteristic of the region shown here lies in the aircraft door 18, which comprises a receptacle 20 for receiving an emergency slide or the such, which receptacle radially extends into the cabin 4. A surface region 24 that extends substantially perpendicular to a cabin access opening 22 or that lies between two opposed access openings 22, which surface region 24 is referred to as door region, is placed directly behind the second section 12 or the seat row 14, respectively, in opposition to the positive x-direction. Not only the receptacle 20 but also the tapering fuselage cross-section lead to the fact that in the second seat row 14, only two passenger seats 10 are integratable, since there is no sufficient installation space for a third passenger seat. However, the installation space created between the door region 24, the aisle 16 and a cabin wall 28 is sufficient for the integration of a stowage compartment 30, which fills a gap created due to the flush arrangement of the seat row 14 to the aisle 16.

The stowage compartment 30 comprises a forward delimiting wall 32, which extends vertically upwards from a cabin floor 34, on which the stowage compartment 30 is fixed through seat rails or dedicated holding points, and curves to a side facing away from a forward passenger seat 10, i.e. into the direction of the aircraft door 18. In doing so, both the created installation space may be well utilized as well as blocking of a swivably supported backrest 36 of the passenger seat 10 positioned in the front may be excluded.

Exemplarily, an outer delimiting wall 38 adapts to a cabin wall 28, while a wall 40 on an access side 42, which faces the seat row 14, is realized in a planar manner. The depth of the stowage compartment 30 in the x-direction roughly corresponds to the depth of a passenger seat 10, wherein, however, the stowage compartment 30 is slightly shifted forward in an x-direction relative to the adjacent passenger seats 30. In doing so, behind the stowage compartment 30, space may be gained for consideration of a sufficient distance to the receptacle 20. This region may also be used as an "assist space" with an opened aircraft door 18.

Figure 2:
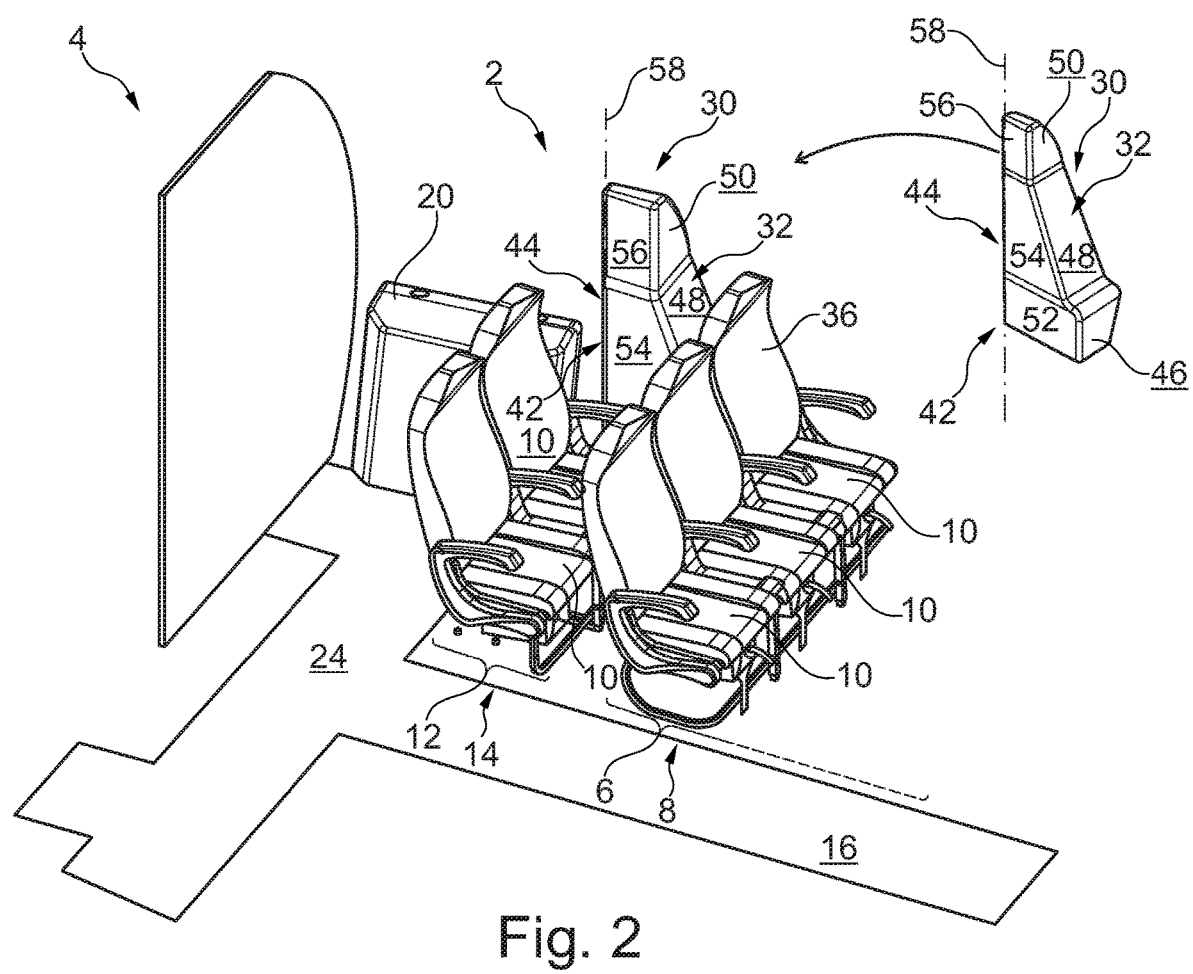
FIG. 2 shows a spatial illustration of the arrangement.

FIG. 2 shows a three-dimensional illustration of the arrangement 2 in a cabin 4. Here, the compactness of the stowage compartment 30, which is additionally shown in a cut-out section, becomes apparent. A rear wall 44 of the stowage compartment 30 substantially runs perpendicular to the cabin floor 34 and thereby clearly differentiates from the door region 24 or the longitudinal extension of the door 18, respectively. The forward delimiting wall 32, however, is exemplarily divided into three sections 46, 48 and 50, which are arranged at an angle to each other or which are arranged in a curved manner to each other altogether, such that a passenger seat placed in front of it may assume a swivelled back position.

For accessing a stowage space in the stowage compartment 30, exemplarily three access flaps 52, 54 and 56 are intended, which are exemplarily swivably arranged around an axis 58 on the stowage compartment 30. The lower access flap 52 may, however, be swivable around a horizontal axis running in the region of the cabin floor 34, since the access flap 52 comprises the largest width of all access flaps 52, 54 and 56. The design of the stowage compartment flaps 52, 54 and 56 should be realized in a way that items placed therein may be protected from falling out during all imaginable loads.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An arrangement in a cabin of an aircraft, comprising:
a plurality of passenger seats, the plurality of passenger seats arranged in seat rows arranged between at least one aisle and a cabin wall,
wherein at least one first section having at least one row with a first number of passenger seats and at least one second section having at least one seat row with a second number of passenger seats are defined, wherein the second number is smaller than the first number,
wherein the at least one seat row of the first section and the at least one seat row of the second section directly border on the at least one aisle,
wherein in the second section between a passenger seat and the cabin wall a stowage compartment is arranged, the stowage compartment configured to be positioned on a cabin floor, and
wherein the passenger seat adjacent the stowage compartment comprises an arm rest between the passenger seat and the stowage compartment along a lateral direction perpendicular to a longitudinal direction of the cabin,
wherein the stowage compartment comprises an extension in a vertical direction, the extension corresponding to an extension of a laterally direct neighbouring passenger seat, and
wherein the stowage compartment comprises a forward delimitation wall facing a passenger seat of the at least one first section arranged in front of the stowage compartment in a seating direction, the forward delimitation wall comprising a plurality of sections arranged at an angle to one another or arranged in a curved manner to one another.

2. The arrangement of claim 1, wherein the stowage compartment comprises an outer delimiting wall facing the cabin wall, the outer delimiting wall following the contour of the cabin wall.

3. The arrangement of claim 1, wherein the first number is three and the second number is two.

4. The arrangement of claim 1, wherein the stowage compartment comprises at least one access opening facing to a laterally neighbouring passenger seat, the access opening configured to be closable through at least one stowage compartment flap.

5. The arrangement of claim 1, wherein the stowage compartment does not extend over a laterally neighbouring passenger seat in a longitudinal direction of the cabin in a seating direction.

6. The arrangement of claim 1, wherein the stowage compartment extends up to a forward end of the second section in the longitudinal direction of the cabin.

7. The arrangement of claim 1, wherein the forward delimitation wall is configured for allowing a backrest of the passenger seat arranged in front of the forward delimitation wall to swivel into a swivelled back position up to at least 20°.

8. The arrangement of claim 1, wherein a plurality of second rows are arranged in the second section one behind the other, wherein the stowage compartment extends along at least one of the second rows in a longitudinal direction of the cabin.

9. The arrangement of claim 8, wherein the stowage compartment extends along a plurality of the second rows of the second section in the longitudinal direction of the cabin.

10. The arrangement of claim 8, wherein the stowage compartment extends along all second rows of the second section along the cabin longitudinal direction.

11. An aircraft, comprising:
a fuselage;
a cabin created therein; and
an arrangement comprising:
a plurality of passenger seats, the plurality of passenger seats arranged in seat rows arranged between at least one aisle and a cabin wall, wherein at least one first section having at least one row with a first number of passenger seats and at least one second section having at least one seat row with a second number of passenger seats are defined, wherein the second number is smaller than the first number, wherein the at least one seat row of the first section and the at least one seat row of the second section directly border on the at least one aisle, wherein in the second section between a passenger seat and an adjacent cabin wall a stowage compartment is arranged, the stowage compartment configured to be positioned on a cabin floor, and wherein the stowage compartment comprises an extension in a vertical direction, the extension corresponding to an extension of a laterally direct neighbouring passenger seat, and wherein the stowage compartment comprises a forward delimitation wall facing a passenger seat of the at least one first section arranged in front of the stowage compartment in a seating direction, the forward delimitation wall comprising a plurality of sections arranged at an angle to one another or arranged in a curved manner to one another.

12. The aircraft of claim 11, wherein the arrangement is positioned at a door region and wherein the second section directly borders on the door region.

13. The aircraft of claim 11, wherein the arrangement is arranged in a tapered fuselage region.

* * * * *